UNITED STATES PATENT OFFICE.

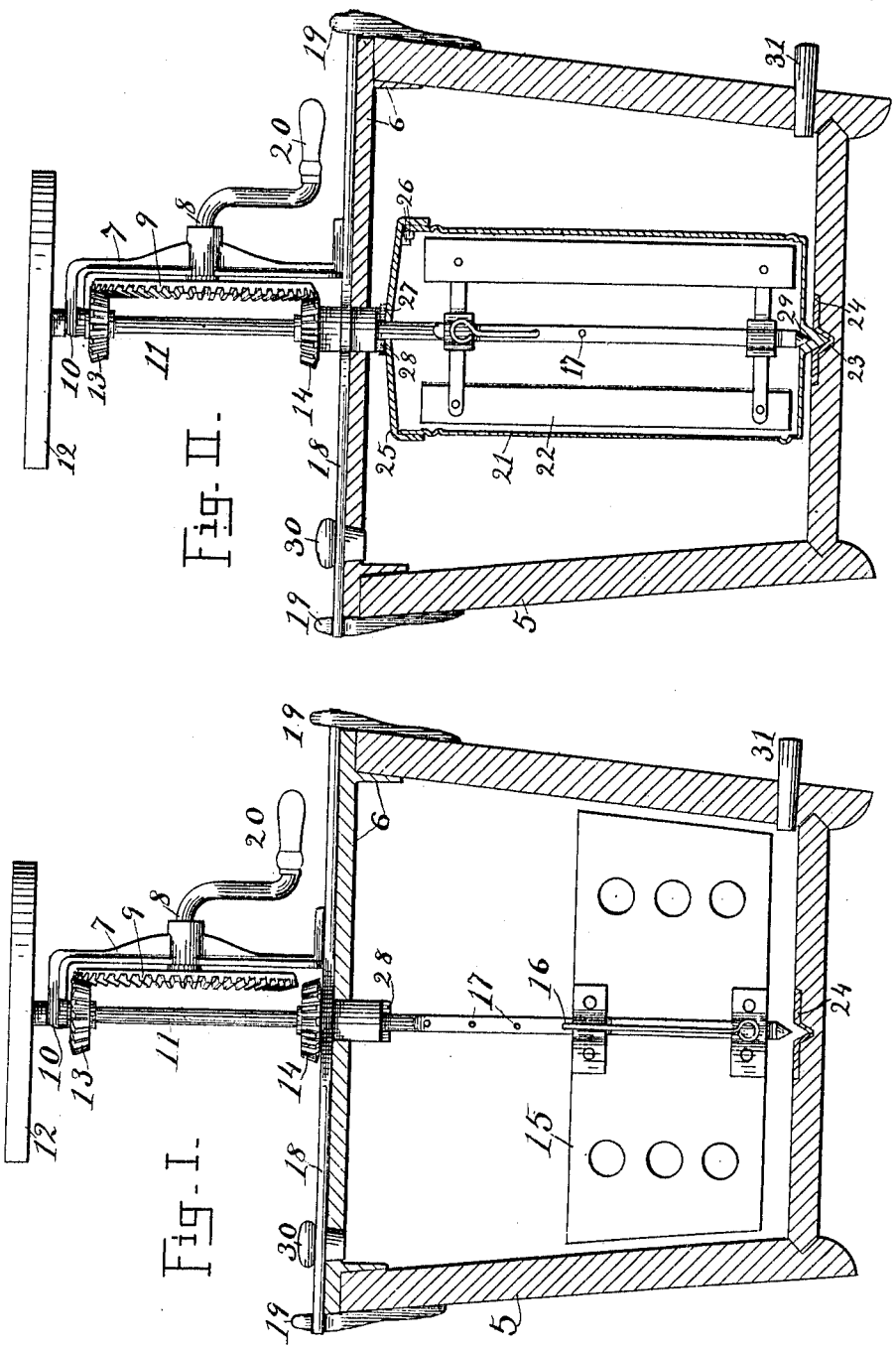

JACOB STEINBERG, OF PITTSBURG, PENNSYLVANIA.

COMBINED CHURN AND ICE-CREAM FREEZER.

984,309.  Specification of Letters Patent.  Patented Feb. 14, 1911.

Application filed August 17, 1909, Serial No. 513,340. Renewed July 13, 1910. Serial No. 571,843.

*To all whom it may concern:*

Be it known that I, JACOB STEINBERG, a citizen of the United States, residing at Pittsburg, in the county of Allegheny and State of Pennsylvania, have invented certain new and useful Improvements in a Combined Churn and Ice-Cream Freezer, of which the following is a specification.

This invention relates to devices for churning cream in making butter and ice-cream. Its object is to adapt operating mechanism to rotate a dasher in a churn for churning butter, and to rotate within the churn an ice-cream freezer can; also to rotate within the can a dasher in the direction opposite to that of the can.

To this end my invention consists in the construction and combination of parts forming a combined churn and ice-cream freezer, hereinafter more fully described, and particularly set forth in the claims, reference being had to the accompanying drawings in which:

Figure 1 represents, in vertical section partly in side elevation, my invention as a churn for making butter. Fig. 2 represents the same churn body and operating mechanism in connection with an ice-cream freezer can and dasher.

Numeral 5 represents a tub serving as the churn body and 6 the lid. Upon this lid is fixed a post 7, which serves as a bearing for the shaft 8, of the beveled drive wheel 9. A bracket arm 10, of the post 7, serves as a bearing for the vertical spindle 11, upon which are rigidly fixed the fly-wheel 12, and the beveled wheel 13. Another beveled wheel 14, has its hub journaled in a bearing in the lid 6, through which it may slide vertically to engage or disengage the drive-wheel 9. The wheel 14, also serves as a bearing in which the spindle 11, may freely rotate.

A dasher 15, is fitted upon the spindle— which may be square along its lower portion to turn the dasher—and is provided with a spring pin 16, to engage any one of a series of holes 17, in the spindle so that the dasher may be carried low or high upon the spindle, according as there is little or much cream in the churn. A bar 18, across the top of the lid, extends its ends beyond the edges of the lid to engage hooks 19, that are fixed to the body 5. The contact faces of the bar and hooks are wedge-shaped to bind the lid firmly upon the body, to form a tight joint when the lid is turned home. To use this churn; place in it the cream; set the dasher upon the spindle at a height which leaves its upper edge above the cream; put the lid with the attached running gear in place, then turn the crank 20, by which the shaft 8, wheels 9, and 13, spindle 11, and dasher 15, are revolved. The dasher is to project partly above the cream in order that the surface thereof may be agitated as much as possible, and air be forced into it by the turning of the dasher. This aeration and churning converts the cream into butter rapidly. As an ice-cream freezer, this mechanism is further provided with a can 21, and a dasher 22; the latter having a pivot 29, stepped in the bottom of the can. At the bottom of the can a pivot 23, projects to engage a bearing step 24. that is fixed in the churn body 5. The lid 25, of the can fits its body closely and engages it by means of lugs 26, so that the can may be revolved with the lid. The lid revolves freely around the spindle and is provided with lugs 27, to engage lugs 28, on the hub of the gear wheel 14. The vertical height of the can 21, is such that when stepped in bearing 24—and the lid 6, with the attached running gear, is pushed down upon the can—the lugs 27, and 28, will be engaged and the wheel 14, will be automatically pushed up into engagement with the drive-wheel 9.

To operate this device as an ice-cream freezer; put the dasher 22, into its step 29; put the cream in the can; put on the can cover; place the can in its step 24; pack the ice and salt in the churn body around the can; insert the spindle 11, in the top of the can and press the cover into place. The pointed end of the spindle will find its way into the dasher because the latter so nearly fills across the can that it cannot be much out of center. Now, by revolving crank 20, the dasher will be rotated as before described of the churn dasher; and, through the action of the drive-wheel 9, on wheel 14, and that acting by means of lugs 28, and 27, on the can, revolves the can in the direction opposite to the revolution of the dasher. The sizes of the wheels 13, and 14, relative to the size of the drive wheel 9, may be made in any proportion required to give the desired speed and power with a crank, 20, of convenient sweep.

By means of this invention one set of driving apparatus is adapted to serve the purpose of two usual machines. The can 21, dasher 22, and wheel 14, are the only extras required to adapt the churn to do the churning of ice-cream, and it may be found that butter may also be churned to advantage in the freezer, in order that the can may be kept at a proper temperature by using warm or cold water around it, as the case may require.

In many families this combined churn and ice-cream freezer should prove to be an economical substitute for two machines made separately for this purpose; and, as before stated, it has some advantages merely as a churn. The plugged inlet 30, and outlet 31, are usual conveniences in churns.

What I believe to be new and desire to secure by Letters Patent is the following:

1. In a device of the class described, a tub; a lid adapted to be secured thereon; a post secured upon the lid and having an arm projecting over the center thereof; a crankshaft journaled in the post and a beveled drivewheel fixed upon the shaft; a spindle journaled in the aforesaid arm and passing through the lid, and having a flywheel and a gearwheel fixed upon it, the latter engaging the said drivewheel; another gearwheel freely mounted upon the spindle above the lid and having a hub journaled in a bearing in said lid; a can having a pivot on its bottom, and the bottom of the tub having a step to receive that pivot; a cover fitting closely yet removably upon the can and having a hole through it to receive the said spindle; the can and the gearwheel that is freely mounted on the spindle having lugs projecting from their adjacent faces to engage each other, the length of the can being such as to push that gear wheel into engagement with the said drivewheel when in service; a dasher mounted on the spindle and stepped in a bearing in the can.

2. In a device of the class described, a tub; a lid therefor; a drivewheel mounted on the lid; a spindle engaged for propulsion by the drivewheel; a can mounted for revolution within the tub, and a gearwheel upon the said spindle, having a hub journaled in the tub lid; the said can engaging the said hub and pushing the gearwheel into engagement with the drivewheel when in service.

3. In a device of the class described, a tub; a removable lid therefor; a drivewheel mounted on the lid; a can mounted for revolution within the tub; a dasher within the can; a spindle for the dasher, geared permanently with the drivewheel, and a gearwheel mounted freely upon the spindle and adapted to automatically engage the drivewheel when the can is in service, substantially as shown and described.

In testimony whereof I affix my signature in presence of two witnesses.

JACOB STEINBERG.

Witnesses:
EMIL STEINBACH,
H. F. FITZSIMMONS.